United States Patent
Via et al.

(10) Patent No.: US 6,399,823 B1
(45) Date of Patent: Jun. 4, 2002

(54) METHOD FOR PRODUCING PHOSGENE

(75) Inventors: Francis Anthony Via, Yorktown Heights; Grigorii Lev Soloveichik, Latham; Philip George Kosky, Niskayuna; Walter Vladimir Cicha, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/845,237

(22) Filed: Apr. 30, 2001

(51) Int. Cl.[7] .............................................. C07C 51/58
(52) U.S. Cl. ...................... 562/847; 562/848; 502/177; 502/423; 502/414; 502/416; 502/439; 502/440
(58) Field of Search ................................. 562/847, 848, 562/480; 423/414, 416, 439, 440; 502/177

(56) References Cited

U.S. PATENT DOCUMENTS

| | | | |
|---|---|---|---|
| 4,073,806 A | * | 2/1978 | Doubovetzky et al. |
| 4,231,959 A | | 11/1980 | Obrecht |
| 4,764,308 A | * | 8/1988 | Sauer et al. |
| 4,914,070 A | | 4/1990 | Ledoux et al. |
| 4,978,649 A | | 12/1990 | Surovikin et al. |
| 5,136,113 A | | 8/1992 | Rao |
| 6,022,993 A | | 2/2000 | Cicha et al. |
| 6,054,107 A | | 4/2000 | Cicha et al. |
| 6,054,612 A | | 4/2000 | Cicha et al. |

FOREIGN PATENT DOCUMENTS

JP 02-06307 1/1990

OTHER PUBLICATIONS

Schnieder et al, Phosgene, Ullman Encyclopedia of Industrial Chemistry, vol. A–19, pp. 411–420.*

* cited by examiner

Primary Examiner—Paul J. Killos
Assistant Examiner—Hector M. Reyes
(74) Attorney, Agent, or Firm—S. Bruce Brown; Noreen C. Johnson

(57) ABSTRACT

A method is disclosed for producing phosgene which in one embodiment comprises contacting in at least one reactor a mixture comprising carbon monoxide and chlorine sequentially with a first catalyst followed by contacting the resulting gaseous reaction mixture comprising phosgene with at least one second catalyst of higher relative activity than a first catalyst. In another embodiment a method is disclosed for producing phosgene which comprises contacting in at least one reactor a mixture comprising carbon monoxide and chlorine with at least one catalyst bed comprising a first catalyst wherein at least a portion of said first catalyst is diluted with a second catalyst of higher relative activity than a first catalyst.

32 Claims, 2 Drawing Sheets

METHOD FOR PRODUCING PHOSGENE

BACKGROUND OF THE INVENTION

The present invention is directed to a method for producing phosgene. More particularly the invention relates to a method for producing phosgene by reaction of carbon monoxide and chlorine in the presence of at least one catalyst.

Phosgene (sometimes known as carbonyl chloride or carbonyl dichloride) finds use in the preparation of organic compounds, monomers and polymers, such as carbonates, isocyanates, chloroformates, carbamates, polyurethanes, and polycarbonates. Various methods for producing phosgene have been previously described in the literature and utilized by industry. One method that is frequently used involves reaction of carbon monoxide with chlorine in the presence of a carbon-comprising catalyst such as activated carbon. The reaction is strongly exothermic and is usually done in multitubular reactors to more effectively control the reaction temperature. Phosgene produced by this method typically contains carbon tetrachloride as a byproduct, often as much as about 250–300 ppm or higher by volume, which may be difficult to separate from phosgene product. For some applications the level of carbon tetrachloride in phosgene often must be removed to a level of about 1 ppm before use of the phosgene. Carbon tetrachloride arises from reaction of chlorine with carbon-comprising catalyst and thus results directly in depletion of catalyst. Carbon tetrachloride has also been implicated in both ozone depletion and in global warming. On a global basis the amount of byproduct carbon tetrachloride produced in commercial phosgene manufacture annually may be as much as 2 million kilograms based on phosgene production of about 4 billion kilograms. Therefore, methods continue to be sought for minimization of carbon tetrachloride byproduct formation using carbon catalysts while maintaining as high a rate of formation of phosgene as possible.

Japanese patent publication No. 02[1990]-06,307 discloses that the amount of carbon tetrachloride produced during a phosgene manufacturing process can be reduced by about 50% to about 150 ppm by using an activated carbon which has been washed with an acid and which contains a total of about 1.5 wt. % or less of metal components comprised of transition metals, boron, aluminum and silicon.

SUMMARY OF THE INVENTION

After diligent experimentation the present inventors have discovered a method for substantially reducing the amount of carbon tetrachloride byproduct produced in phosgene manufacture while maintaining a high rate of formation of phosgene. In one of its embodiments the present invention is a method for producing phosgene which comprises contacting in at least one reactor a mixture comprising carbon monoxide and chlorine sequentially with a first catalyst followed by contacting the resulting gaseous reaction mixture comprising phosgene with at least one second catalyst of higher relative activity than a first catalyst. In another of its embodiments the present invention is a method for producing phosgene which comprises contacting in at least one reactor a mixture comprising carbon monoxide and chlorine with at least one catalyst bed comprising a first catalyst wherein at least a portion of said first catalyst is diluted with a second catalyst of higher relative activity than a first catalyst various other features, aspects, and advantages of the present invention will become more apparent with reference to the following description and appended claims.

DETAILED DESCRIPTION OF THE INVENTION

Figure 1:
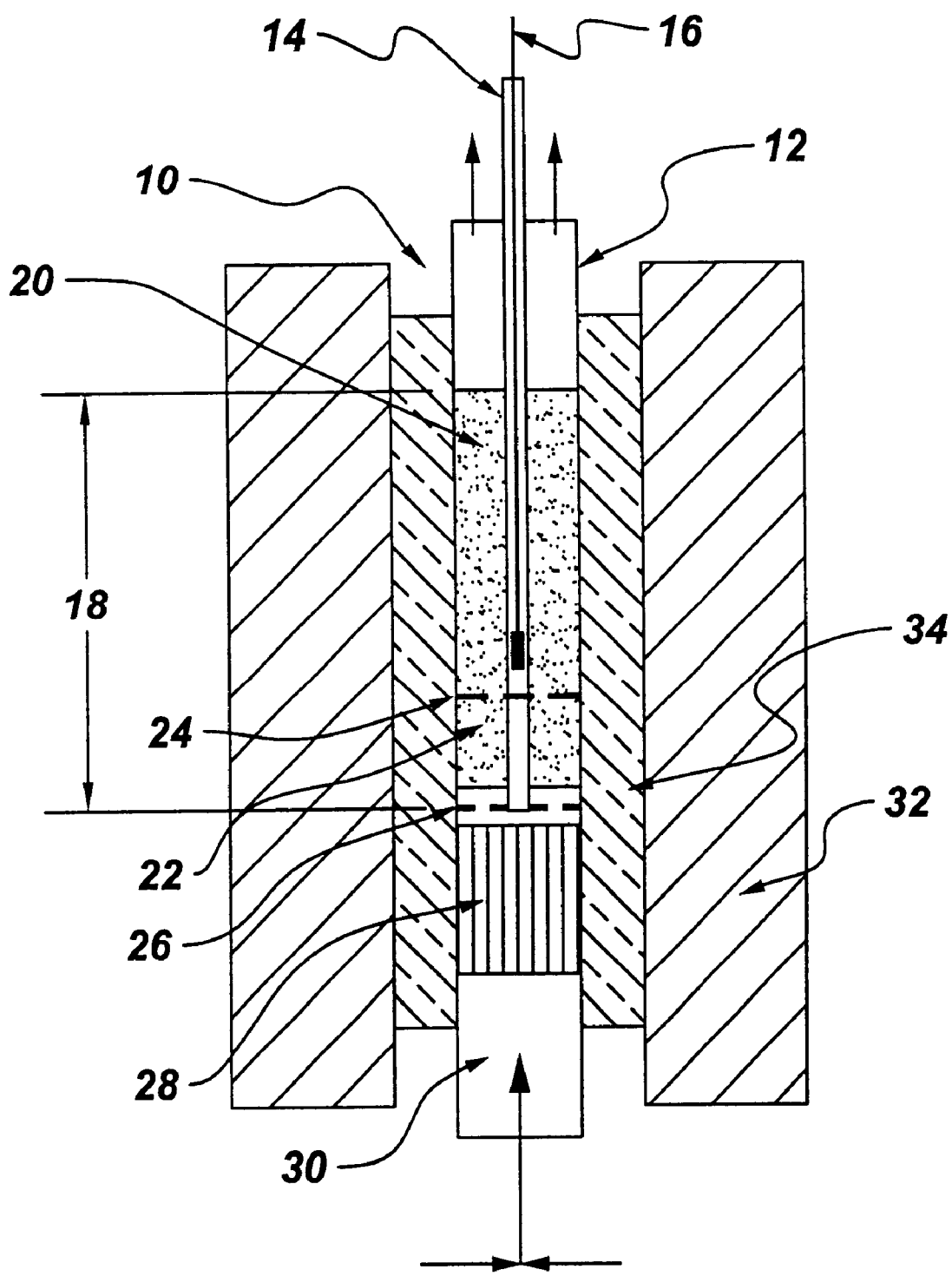
FIG. 1 shows an apparatus for producing phosgene in one embodiment of the invention.

In one embodiment the present invention is a method for producing phosgene containing very low levels of carbon tetrachloride byproduct. Phosgene made using the methods of the present invention contains in one embodiment less than about 100 ppm by volume of carbon tetrachloride, in another embodiment less than about 55 ppm by volume of carbon tetrachloride, in still another embodiment less than about 20 ppm by volume of carbon tetrachloride, in still another embodiment less than about 10 ppm by volume of carbon tetrachloride, in still another embodiment less than about 7 ppm by volume of carbon tetrachloride, in still another embodiment less than about 5 ppm by volume of carbon tetrachloride, and in still another embodiment less than about 1 ppm by volume of carbon tetrachloride.

Carbon monoxide and chlorine reaction gases employed in the preparation of phosgene are typically high purity grades, although a suitable carbon monoxide is often supplied from an on-site generating plant and may comprise trace amounts of impurities, such as, but not limited to, hydrogen, methane, volatile sulfur compounds, and nitrogen. Recycled carbon monoxide recovered from phosgene product stream may also be employed as part of the carbon monoxide-comprising feed stream. In one embodiment essentially pure carbon monoxide and essentially pure chlorine are used.

The compositions of mixtures of carbon monoxide and chlorine can be varied in concentration ranges. In one embodiment carbon monoxide is used in equimolar amount or in molar excess of chlorine. In these embodiments there is typically employed a carbon monoxide : chlorine molar ratio (normalized on chlorine) in a range of between about 1.00:1 and about 1.25:1, in another embodiment in a range of between about 1.01:1 and about 1.20:1, in still another embodiment in a range of between about 1.01:1 and about 1.12:1, in still another embodiment in a range of between about 1.02:1 and about 1.12:1, and in yet still another embodiment in a range of between about 1.02:1 and about 1.06:1. In another embodiment it is desirable to convert as much of the chlorine feed to phosgene as is possible and to minimize the amount of residual chlorine in the reaction product. This may be generally accomplished by maintaining a stoichiometric excess of carbon monoxide in the reactor to drive the reaction towards completion with respect to chlorine.

In one embodiment all the carbon monoxide requirement and all the chlorine requirement are fed initially to a reactor. In another embodiment at least some but less than all the requirement of carbon monoxide is introduced to a first stage reaction zone with the remaining carbon monoxide being introduced to at least one downstream reaction zone, wherein said at least one downstream reaction zone is in serial communicating relationship with said first reaction zone. In this latter embodiment an initial molar ratio of carbon monoxide: chlorine is less than one, and in certain embodiments the initial molar ratio of carbon monoxide: chlorine (normalized on chlorine) is in a range of between about 0.999:1 and about 0.2:1; in other embodiments is in a range of between about 0.999:1 and about 0.5:1; in other embodiments is in a range of between about 0.999:1 and about 0.8:1; in other embodiments is in a range of between about 0.999:1 and about 0.95:1; and in still other embodiments is in a range of between about 0.999:1 and about 0.98:1.

In one of its embodiments the present invention is a method for producing phosgene which comprises contacting in at least one reactor a mixture comprising carbon monoxide and chlorine sequentially with a first catalyst followed by contacting the resulting reaction mixture comprising phosgene with at least one second catalyst of higher relative activity than a first catalyst. In a particular embodiment any catalyst after a first catalyst has a higher relative activity for phosgene formation than a first catalyst. In another particular embodiment the present invention is a method for producing phosgene which comprises contacting in at least one reactor a mixture comprising carbon monoxide and chlorine sequentially with at least two catalysts, wherein any catalyst after a first catalyst has a higher relative activity for phosgene formation than the catalyst immediately preceding it. Relative activity in this context may be measured by methods known in the art. In one embodiment relative activity may be measured by comparing the exotherm associated with reaction of carbon monoxide and chlorine in contact with each catalyst separately under similar conditions, with a higher exotherm indicative of a more active catalyst. In another embodiment relative activity may be measured by comparing the onset of chlorine breakthrough as a function of flow rate and reactor set temperature in the reaction of carbon monoxide and chlorine at a specific molar ratio in contact with each catalyst separately under similar conditions, with a breakthrough at a lower flow rate at a given reactor set temperature or breakthrough at a lower reactor set temperature at a given flow rate indicative of a less active catalyst. In the present context similar conditions may include similar ratios of carbon monoxide to chlorine, similar amounts of catalyst, similar flow rates, similar reactors, and similar reactor set temperatures. In still another embodiment relative activity may be measured by comparing the rate constants for phosgene formation over each of two different catalysts, wherein the rate constant may be represented by equation (1):

$$d[COCl_2]/dt = k_0 e^{-Ea/RT}[CO]([Cl_2]/A*[CO]+[COCl_2])^m \quad (1)$$

where $k_0$ is the rate constant, A is a constant, m=0.25, as given by E. N. Shapatina, V. L. Kuchaev, B. E. Penkovoy, and M. I. Temkin, in Kinetics and Catalysis (Russian), 1976, volume 27, p. 644.

The relative amounts of first and second (and any subsequent) catalysts are such that phosgene is produced which contains an amount of carbon tetrachloride which is less than that produced using higher activity catalyst alone under essentially the same reaction conditions. In one embodiment the amount by volume of lower activity catalyst is in a range of between about 0.5% and about 70% of the total volume of catalyst; in another embodiment in a range of between about 1% and about 60% of the total volume of catalyst; in another embodiment in a range of between about 2% and about 50% of the total volume of catalyst; in another embodiment in a range of between about 5% and about 50% of the total volume of catalyst; in another embodiment in a range of between about 10% and about 30% of the total volume of catalyst; and in still another embodiment in a range of between about 10% and about 20% of the total volume of catalyst.

In one embodiment a first catalyst has a high selectivity for phosgene formation measured using the same reaction conditions under which both a first and a second (and any subsequent) catalyst are employed in an embodiment of the present invention. In the present context a high selectivity for phosgene formation includes the requirement that phosgene may be produced which contains an amount of carbon tetrachloride in a range of between 0 ppm and about 200 ppm by volume using the first catalyst alone. A first catalyst also has a higher relative selectivity for phosgene than a second (and any subsequent) catalyst. In one embodiment relative selectivity may be measured by the amount of carbon tetrachloride byproduct associated with reaction of carbon monoxide and chlorine in contact with each catalyst separately under similar conditions, with a higher carbon tetrachloride level indicative of a less selective catalyst. In the present context similar conditions may include similar ratios of carbon monoxide to chlorine, similar amounts of catalyst, similar flow rates, similar reactors, and similar reactor set temperatures.

In another embodiment a catalyst bed comprises at least some portion of first catalyst diluted with a second catalyst of higher relative activity than a first catalyst. Dilution may be essentially homogeneous or in a gradient or a combination of homogenous and gradient. In one embodiment a first catalyst zone at the initial point of contact with reactant gases contains a first catalyst diluted with a minor proportion of a second catalyst of higher relative activity, while a second catalyst zone contains said second catalyst which is diluted with a minor proportion of said first catalyst. In another embodiment a second catalyst of relatively higher activity may be distributed in a gradient in a first catalyst with the lowest concentration of second catalyst being present at the initial point of contact with reactant gases and the concentration of second catalyst gradually increasing until the highest concentration of second catalyst is attained at the exit point of product gases from a catalyst bed. In another embodiment a second catalyst of relatively higher activity may be distributed in a gradient in a first catalyst within a first catalyst zone with the lowest concentration of second catalyst being present at the beginning of a first catalyst zone and the concentration of second catalyst gradually increasing until the highest concentration of second catalyst is attained at an end of a first catalyst zone, and a second catalyst is contained within a second catalyst zone with essentially no first catalyst in admixture. Those skilled in the art will realize that the distribution of any catalyst in any other catalyst may be essentially homogeneous or in a gradient or somewhere in between without departing from the embodiments of the present invention. In some embodiments at the initial point of contact of catalyst with reactant gases a proportion of first catalyst may be present undiluted with second catalyst of higher relative activity, while any remaining portion of first catalyst may be diluted with second catalyst of higher relative activity.

In another of its embodiments the present invention is a method for producing phosgene which comprises contacting in at least one reactor a mixture comprising carbon monoxide and chlorine sequentially with at least one first catalyst zone comprising a catalyst following by contacting the resulting mixture comprising phosgene with at least one second catalyst zone comprising said catalyst with a higher total surface area than that catalyst in a first catalyst zone. In this embodiment essentially a single type of catalyst is employed. A first catalyst zone is at the initial point of contact with reactant gases. A higher total surface area of catalyst in a second (and any subsequent) catalyst zone compared to catalyst in a first catalyst zone containing essentially the same catalyst may be achieved by any convenient method. In one embodiment a first catalyst zone contains catalyst diluted with an inert filler which does not itself react under the reaction conditions and which does not catalyze or otherwise inhibit the phosgene synthesis reaction, while a second catalyst zone contains the same catalyst which is diluted with less inert filler than that in a first catalyst zone. In another embodiment a first catalyst zone contains catalyst diluted with an inert filler while a second catalyst zone contains the same catalyst which is not diluted with inert filler. Inert filler may be essentially evenly distributed among catalyst particles and two catalyst zones may be sequentially loaded with catalyst containing inert filler in a first catalyst zone followed by catalyst in a second catalyst zone containing less inert filler. Alternatively, inert filler may be distributed in a gradient among catalyst particles in each catalyst zone with the highest concentration of inert filler being present at the beginning of a first catalyst zone and the concentration of inert filler gradually decreasing until the lowest concentration of inert filler is attained at an end of a second catalyst zone. In another embodiment inert filler may be distributed in a gradient among catalyst particles in a first catalyst zone with the highest concentration of inert filler being present at the beginning of a first catalyst zone and the concentration of inert filler gradually decreasing until the lowest concentration of inert filler is attained at an end of a first catalyst zone, and the second catalyst zone contains no inert filler. Those skilled in the art will realize that the distribution of any filler in any catalyst zone may be essentially homogeneous or in a gradient or somewhere in between without departing from the scope of the present invention. In some embodiments a proportion of catalyst near tie exit point of product gases from a catalyst bed may be present undiluted with inert filler, while any remaining portion of catalyst nearer the initial point of contact of catalyst with reactant gases may be diluted with inert filler.

The types of inert filler are not particularly limited. In one embodiment inert fillers are low porosity materials. In another embodiment inert fillers may be selected from the group consisting of ceramics, graphite, glassy carbon, glass, quartz, and metals. Suitable metals comprise those which are not reactive under the reaction conditions and more particularly which are not reactive toward chlorine, carbon Monoxide, or phosgene under the reaction conditions. In one embodiment metals suitable for inert fillers are selected from the group consisting of stainless steel, titanium, nickel, or metal alloys, including, but not limited to, nickel alloys comprising iron and chromium (such as INCONEL), or nickel alloys comprising molybdenum and chromium (such as HASTELLOY). In another embodiment suitable fillers are at least substantially inert in that they do not themselves react at an appreciable rate under the reaction conditions and do not catalyze or otherwise inhibit the phosgene synthesis reaction. Substantially inert in the present context means that a filler does not produce a level of byproducts that is outside a specification range for phosgene product.

In one embodiment the process of contacting in at least one reactor a mixture comprising carbon monoxide and chlorine sequentially with at least one first catalyst zone comprising a catalyst following by contacting the resulting mixture comprising phosgene with at least one second catalyst zone comprising said catalyst with a higher total surface area than essentially the same catalyst in a first catalyst zone is equivalent to providing a second catalyst of higher relative activity than a first catalyst, wherein relative activity is measured as described hereinabove.

In one embodiment at least one catalyst used in the methods of the present invention is a carbon-comprising catalyst, such as carbon. Any carbon-comprising catalyst known in the art as a useful catalyst for phosgene preparation from carbon monoxide and chlorine may be used as at least one catalyst in the method of the invention. In various embodiments carbon from any of the following sources is useful as at least one catalyst for the method of the invention; wood, peat, coal, coconut shells, bones, lignite, petroleum-based residues and sugar. The carbon can be in convenient forms such as powder, granules, particles, or pellets, or the like. In one embodiment the carbon surface area as determined by BET measurement is greater than about 100 square meters per gram ($m^2/g$); in another embodiment greater than about 300 $m^2/g$. In another embodiment active charcoal having a specific surface area of about 1,000 $m^2/g$ and having a particle size in a range of between about 0.4 millimeters (mm) and about 5 mm may be employed. In still another embodiment carbon surface areas are in a range of between about 550 $m^2/g$ and about 1000 $m^2/g$. In yet still another embodiment carbon surface areas are about 2000 $m^2/g$ or less.

In one embodiment there is employed as at least one catalyst a carbon which (1) has an active metal content of less than about 1000 ppm by weight, and (2) loses about 12% of its weight, or less, when sequentially heated in air for the following times and temperatures; 125° C. for 30 minutes, 200° C. for 30 minutes, 300° C. for 30 minutes, 350° C. for 45 minutes, 400° C. for 45 minutes, 450° C. for 45minutes and finally at 500° C. for 30 minutes as disclosed in U.S. Pat. No. 6,022,993. This sequence of time and temperature conditions for evaluating the effect of heating carbon samples in air may be ran using thermal gravimetric analysis (TGA). Carbons which when subjected to this protocol lose about 12% of their weight, or less, are considered to be advantageously oxidatively stable.

As used in the context of this embodiment the term "active metals" includes transition metals of Groups 3 to 10 of the Periodic Table, boron, aluminum and silicon. Carbon which contains less than about 1000 ppm by weight of active metals is typically employed in this embodiment. Iron is considered a particularly harmful active metal (i.e., the greater the amount of iron the larger the amount of carbon tetrachloride produced). In a particular embodiment carbons are used which not only have an active metal content of less than about 1000 ppm by weight, but also contain less than about 100 ppm by weight of iron. In another particular embodiment carbons are used which not only have an active metal content of less than about 1000 ppm by weight, but also contain less than about 80 ppm by weight of iron. In another particular embodiment carbons are used which contain less than about 200 ppm by weight of sulfur and less than about 200 ppm by weight of phosphorus. In another particular embodiment carbons are used which contain less than about 100 ppm by weight of sulfur and less than about 100 ppm by weight of phosphorus. Commercially available carbons which are included in these particular embodiments include those sold under the following trademarks: Barnebey Sutcliffe™, Darco™, Nuchar™, Columbia JXN™, Columbia LCK™, Calgon PCB™, Calgon BPL™, Westvaco™, Norit™ and Barnebey Cheny NB™. In another embodiment acid-washed carbons are employed (for example, carbons which have been treated with hydrochloric acid or hydrochloric acid followed by hydrofluoric acid).

Acid treatment is often sufficient to provide carbons which contain less than about 1000 ppm of active metals. Suitable acid treatment of carbons is described for example in U.S. Pat. No. 5,136,113.

In another embodiment at least one catalyst used in the method of the present invention is a three dimensional matrix, porous carbonaceous material. Examples include those described in U.S. Pat. No. 4,978,649. Of note are three dimensional matrix carbonaceous materials which are obtained by introducing gaseous or vaporous carbon-containing compounds (for example, hydrocarbons) into a mass of granules of a carbonaceous material (for example, carbon black); decomposing the carbon-containing compounds to deposit carbon on the surface of the granules; and treating the resulting material with an activator gas comprising steam to provide a porous carbonaceous material. A carbon-carbon composite material is thus formed which is suitable as a catalyst.

In another embodiment there is employed as at least one catalyst a carbon having properties which include (1) a micropore to macropore ratio of 3.5 or less; and (2) loss of about 16% of its weight or less, in another embodiment about 10% of its weight or less, and in still another embodiment about 5% of its weight or less when sequentially heated in air for the following times and temperatures: 125° C. for 30 minutes, 200° C. for 30 minutes, 300° C. for 30 minutes, 350° C. for 45 minutes 400° C. for 45 minutes, 450° C. for 45 minutes and finally at 500° C. for 30 minutes as disclosed in U.S. Pat. No. 6,054,612. In this embodiment the active metal content of the carbon may be 1000 ppm or more. The sequence of time and temperature conditions for evaluating the effect of heating carbon samples in air may be run using thermal gravimetric analysis (TGA).

The carbon materials in this embodiment are porous (i.e., they possess a surface area of at least 10 $m^2/g$), and contain both micropores and macropores. As used in this context, the term "micropore" means a pore size of about 20 Å (angstroms) or less and the term "macropore" means a pore size of greater than about 20 Å. The total pore volume and the pore volume distribution can be determined, for example, by methods known in the art, such as by porosimetry. The micropore volume (cc/g) is subtracted from the total pore volume (cc/g) to determine the macropore volume. The ratio of micropores to macropores is then easily calculated. The carbons materials in one embodiment have a micropore to macropore ratio of less than about 3.5, in another embodiment about 2.0 or less, and in still another embodiment about 1.0 or less. In yet still another embodiment the carbons materials have a micropore to macropore ratio of about zero. Commercially available carbons which may be used in these particular embodiments include those sold under the trademarks Calgon X-BCP™ and Calsicat™.

In another embodiment there is employed as at least one catalyst a carbon having properties which include (1) a pore volume in a range of between about 0.2 cubic centimeters per gram (cc/g) and about 1.7 cc/g formed by bent layers of carbon of a thickness in a range of between about 100 angstroms (Å) and about 10,000 Å and a radius of curvature in a range of between about 100 Å and about 10,000 Å, (2) a true density in a range of between about 1.80 grams per cubic centimeter (g/cc) and about 2.10 g/cc, (3) an X-ray density in a range of between about 2.112 g/cc and about 2.236 g/cc, and (4) a pore size distribution having its maximum within the range of between about 200 Å and about 2000 Å as disclosed in U.S. Pat. No. 4,978,649.

In another embodiment a silicon carbide-containing catalyst with a surface area greater than about 10 square meters per gram may be used as at least one of the catalysts in the process of the present invention. In another embodiment a silicon carbide-containing catalyst with a surface area greater than about 20 square meters per gram may be used as at least one of the catalysts in the process of the present invention. In still another embodiment a silicon carbide having a surface area greater than about 100 $m^2/g$, prepared by methods disclosed in U.S. Pat. No. 4,914,070 may be used as at least one of the catalysts. In one embodiment a silicon content of at least about 5 weight % is used. In another embodiment a silicon content is at least about 10 weight % is used. Of note are embodiments where the catalyst is manufactured using a process which comprises contacting silicon monoxide with finely divided carbon as disclosed, for example, in U.S. Pat. No. 4,914,070. In one embodiment a carbon which has an ash content of less than about 0.1 wt. % is used to produce the silicon carbide.

In one embodiment a silicon carbide catalyst suitable for use as at least one catalyst in the present invention is prepared by a process disclosed in U.S. Pat. No. 6,054,107 which comprises reacting vapors of silicon monoxide, SiO, on carbon by the steps of: (a) generating vapors of SiO in a first reaction zone by heating a mixture of $SiO_2$ and Si at a temperature of between about 1100° C. and about 1400° C., under a pressure in a range of between about 0.1 kilopascals and about 1.5 kilopascals; and (b) contacting in a second reaction zone at a temperature in a range of between about 1100° C. and about 1400° C., the SiO vapors generated in said first reaction zone with finely divided reactive carbon with a specific surface area that is equal to or greater than about 200 m2/g. Examples of suitable reactive carbons include graphite pellets obtained by powder agglomeration, and activated carbon such as powdered activated carbon obtained by crushing granules of activated carbon. In one embodiment a silicon carbide surface area as determined by BET measurement is greater than about 100 $m^2/g$ and in another embodiment is greater than about 300 $m^2/g$.

First and second (and any subsequent) catalysts, or in another embodiment, first and second (and any subsequent) catalyst zones, may be contained in a single reactor or in an alternative embodiment in two or more separate reactors which may be in serial communicating relationship with each other. Typically a reactor comprises at least one reaction vessel to contain catalyst. For example, a first catalyst (or first catalyst zone) may be contained in a first reactor (sometimes referred to in the art as a primary reactor) and a second catalyst (or second catalyst zone) of higher relative activity than first catalyst may be contained in a second reactor (sometimes referred to as a finishing reactor or downstream reactor). In another embodiment at least one reactor may be loaded sequentially with a volume of first catalyst followed by a volume of second catalyst. The types of reactor or reactors include those known in the art, illustrative examples of which include shell-and-tube-type reactors, jacketed tank-type of reactors, and conventional water- or low pressure steam-jacketed tank-type of reactors.

In another embodiment first and second (and any subsequent) catalysts, or in another embodiment, first and second (and any subsequent) catalyst zones are contained in at least one reaction tube such as is illustrated in FIG. 1 which shows an apparatus 10 for producing phosgene in one embodiment of the invention. As shown in FIG. 1 a suitable reactor may be a tubular flow reactor comprising at least one reaction tube 12. However, the reactor may also be designed in a different way. In the embodiment illustrated in FIG. 1 a reaction tube 12 contains an optional slide tube 14 smaller in diameter than reaction tube 12 for housing an optional movable thermocouple 16. Optional slide tube 14 extends the entire length of tube 12 and is welded closed at its lower end. The reaction tube 12 is fitted with a porous frit 26 attached at its lower end to serve as a pedestal fitting snugly into the inner reaction tube 12 diameter. This pedestal acts as a support for a catalyst bed 18 that is added to the reactor. The end of optional slide tube rests 14 on the porous frit 26 ensuring that the bottom of a catalyst bed 18 coincides with the furthermost location of the optional movable thermocouple 16 in the optional slide tube 14. By changing the position of the movable thermocouple 16 in the slide tube 14, the temperature along the length of the reaction tube 12 and particularly in the catalyst bed 18 may be measured. A porous, inert heat transfer medium 28 of high surface area such as a wound fine meshed metal screen is positioned at the entrance of the reaction tube 12 so that the reactor is in plug flow regime and the feed gases entering the entrance 30 of the reaction tube 12 attain the approximate pre-set reaction temperature before contact with the catalyst bed 18. The catalyst bed 18 comprises a lower activity catalyst 22 and a relatively higher activity catalyst 20. A lower activity catalyst 22 is contained in the bottom part of reaction tube 12 and is separated from a relatively more active catalyst 20 above it using a porous separation grid 24. The porous separation grid 24 essentially keeps a lower activity catalyst 22 and a relatively higher activity catalyst 20 from intermixing. In alternative embodiments a porous separation grid 24 is not present. The reaction tube 12 is in contact with a solid heat transfer medium 34 such as, but not limited to, aluminum, which is in turn in contact with a heat source 32, such as a furnace.

A reaction tube 12 may be made from a corrosion resistant material or may be lined with a corrosion resistant material. In the present context a corrosion resistant material is one which is essentially inert to chlorine, carbon monoxide, and phosgene. Illustrative corrosion resistant materials comprise ceramic, stainless steel, titanium, nickel, or metal alloys, including, but not limited to, nickel alloys comprising iron and chromium (such as INCONEL), or nickel alloys comprising molybdenum and chromium (such as HASTELLOY). Porous frit 26, porous separation grid 24, and optional slide tube 14 may be made from similar or different corrosion resistant materials.

Reaction temperature in any apparatus used to make phosgene by the method of the present invention may be varied in a broad range and is generally chosen in consideration of such factors as maximization of phosgene space-time yield and minimization of chlorine breakthrough and carbon tetrachloride production. In one embodiment a reactor may be run at the highest possible temperature that achieves maximum production of phosgene without chlorine breakthrough. In another embodiment reaction temperature is measured in the reactant gas inlet stream into a reactor and the product gas outlet stream from a reactor, and the temperatures are in a range of between about 30° C. and about 350° C.; in another embodiment in a range of between about 30° C. and about 300° C.; in still another embodiment in a range of between about 30° C. and about 200° C.; in still another embodiment in a range of between about 30° C. and about 120° C.; and in yet still another embodiment in a range of between about 30° C. and about 90° C.

In another embodiment a reaction temperature may be conveniently equated with an approximate reactor set temperature implemented through a source of heat such as a furnace (32 of FIG. 1) and measured by one or more thermocouples positioned in solid heat transfer medium 34 of FIG. 1. Reactor set temperatures are in one embodiment in a range of between about 30° C. and about 350° C.; in another embodiment in a range of between about 80° C. and about 300° C.; and in still another embodiment in a range of between about 100° C. and about 200° C.

Without further elaboration, it is believed that one skilled in the art can, using the description herein, utilize the present invention to its fullest extent. The following examples are included to provide additional guidance to those skilled in the art in practicing the claimed invention. While some of the examples are illustrative of various embodiments of the claimed invention, others are comparative. The examples provided are merely representative of the work that contributes to the teaching of the present application. Accordingly, these examples are not intended to limit the invention, as defined in the appended claims, in any manner.

Experiments were carried out in a tubular flow reactor as shown in FIG. 1. The reactor consisted of a reaction tube (12) about 2 feet long and 0.5 inch outside diameter (OD) into which catalyst could be poured and retained. The reaction tube (12) was fitted with a small diameter (0.125 inches) axial slide tube (14) extending the entire length of the reaction tube 12 to hold a movable thermocouple 16. The slide tube 14 was welded closed at its lower end. The reaction tube 12 was fitted with a porous frit 26 attached at its lower end to serve as a pedestal that fit snugly into the inner reaction tube diameter. This pedestal acted as support for the catalyst bed 18 that was added to the reactor. The end of the slide tube 14 rested on the pedestal ensuring that the bottom of the catalyst bed 18 coincided with the furthermost location of the movable thermocouple 16 in the slide tube 14. A fine meshed, corrosion resistant metal screen (28) about 20 centimeters (cm) to about 25 cm long was tightly wound and pushed into the entrance of the reactor. It ensured that the entrance to the catalyst bed was in plug flow regime and allowed the feed gases to attain the approximate pre-set reactor temperature before contact with the catalyst bed 18. All parts of the reactor contacting with chlorine including the screen 28 and the separation grid 24 were constructed of INCONEL 600 alloy.

Two different catalysts were employed. The first, referred to hereinafter as "Catalyst A" and described in U.S. Pat. No. 4,978,649, was a porous carbonaceous material in the form of a three-dimensional matrix with a pore volume in a range of between about 0.2 cubic centimeters per gram (cc/g) and about 1.7 cc/g formed by bent layers of carbon of a thickness in a range of between about 100 angstroms (Å) and about 10,000 Å and a radius of curvature in a range of between about 100 Å and about 10,000 Å, a true density in a range of between about 1.80 grams per cubic centimeter (g/cc) and about 2.10 g/cc, an X-ray density in a range of between about 2.112 g/cc and about 2.236 g/cc, and a pore size distribution having its maximum within the range of between about 200 Å and about 2000 Å. A second catalyst employed was Barnebey Cheney coconut shell carbon referred to hereinafter as "Catalyst B". Catalyst B had a higher activity than Catalyst A.

The lower activity catalyst, Catalyst A, was loaded into the bottom part of the reactor and separated from the more active catalyst above it, Catalyst B, with a separation grid 24. Two separate composite catalyst beds with 15% and 30% of Catalyst A by volume (with the remainder of the catalyst bed volume comprising Catalyst B) were tested in comparison with a uniform catalyst bed of pure Catalyst B. The total length of each catalyst bed was 10 cm. Chlorine and carbon monoxide gases were made to flow over and through the catalyst bed. The carbon monoxide:chlorine molar ratio was set in a range of between about 1.02 and about 1.1, and the total gas flow was set in a range of between about 100 standard cubic centimeters per minute (sccm) and about 250 sccm using two mass-flow controllers. Total gas pressure was maintained at about 138 kilopascals. Reactor temperature used was set in a range of between about 100° C. and about 300 ° C. Axial centerline temperatures were registered by the movable thermocouple 16. Temperatures were measured and analytical data collected after the reaction had reached a steady state as measured by the stability of the temperature readings and analysis of the gas mixture. The data reported in Table 1 are average values for data points collected about every 30 minutes after the reaction reached steady state. The product gas mixture was analyzed by gas chromatography/mass spectroscopy (GC/MS). Chlorine breakthrough means that chlorine was detected. Values for carbon tetrachloride are in ppm by volume. The results are shown in Table 1.

high flow and temperature. In contrast, pure Catalyst A had chlorine breakthrough at high flow even at the lower set temperature of 160° C. On the other hand, pure Catalyst B showed chlorine breakthrough only at high flow and high temperature when the carbon monoxide:chlorine ratio was reduced to 1.02.

These results demonstrate the beneficial use of the composite catalyst beds for phosgene production with decreased levels of byproduct carbon tetrachloride. The method also extends the lifetime of carbon-comprising catalysts used in the manufacture of phosgene. Although the invention is not meant to be limited by any theory of operation it is believed that the lower levels of byproduct carbon tetrachloride obtained using composite catalyst beds is due to the lower reaction exotherm obtained compared to the reaction exotherm obtained using a homogeneous catalyst bed containing only the relatively higher activity catalyst of a composite catalyst bed.

TABLE 1

| Catalyst bed | Set T, ° C. | Total flow, sccm | $CO:Cl_2$ ratio | Maximum axial centerline T, ° C. | Chlorine breakthrough | $CCl_4$, ppm* |
|---|---|---|---|---|---|---|
| Catalyst B 100% | 100 | 100 | 1.1 | 166 | no | 5.9 |
|  | 100 | 250 | 1.1 | 260 | no | 5.6 |
|  | 100 | 250 | 1.02 | 261 | no | 14.1 |
|  | 300 | 250 | 1.1 | 401 | no | 49.9 |
|  | 300 | 250 | 1.02 | 405 | yes | 71.2 |
| Catalyst A 15%, Catalyst B 85% | 100 | 100 | 1.1 | 153 | no | 2.3 |
|  | 100 | 250 | 1.1 | 216 | no | 4.3 |
|  | 100 | 250 | 1.02 | 218 | no | 5.1 |
|  | 300 | 250 | 1.1 | 382 | no | 10.7 |
|  | 300 | 250 | 1.02 | 385 | no | 7.2 |
| Catalyst A 30%, Catalyst B 70% | 100 | 100 | 1.1 | 146 | no | 2.6 |
|  | 100 | 250 | 1.1 | 193 | no | 2.3 |
|  | 100 | 250 | 1.02 | 198 | no | 4.5 |
|  | 300 | 250 | 1.1 | 380 | no | 8.7 |
|  | 300 | 250 | 1.02 | 384 | no | 16.4 |
| Catalyst A 100% | 100 | 100 | 1.1 | 144 | no | 0.23 |
|  | 100 | 250 | 1.1 | 203 | yes | n/a |
|  | 160 | 250 | 1.1 | 270 | yes | 2.4 |
|  | 300 | 250 | 1.1 | 378 | no | 4.1 |
|  | 300 | 250 | 1.02 | 380 | no | 3.7 |

*Average of 2–4 measurements

Figure 2:
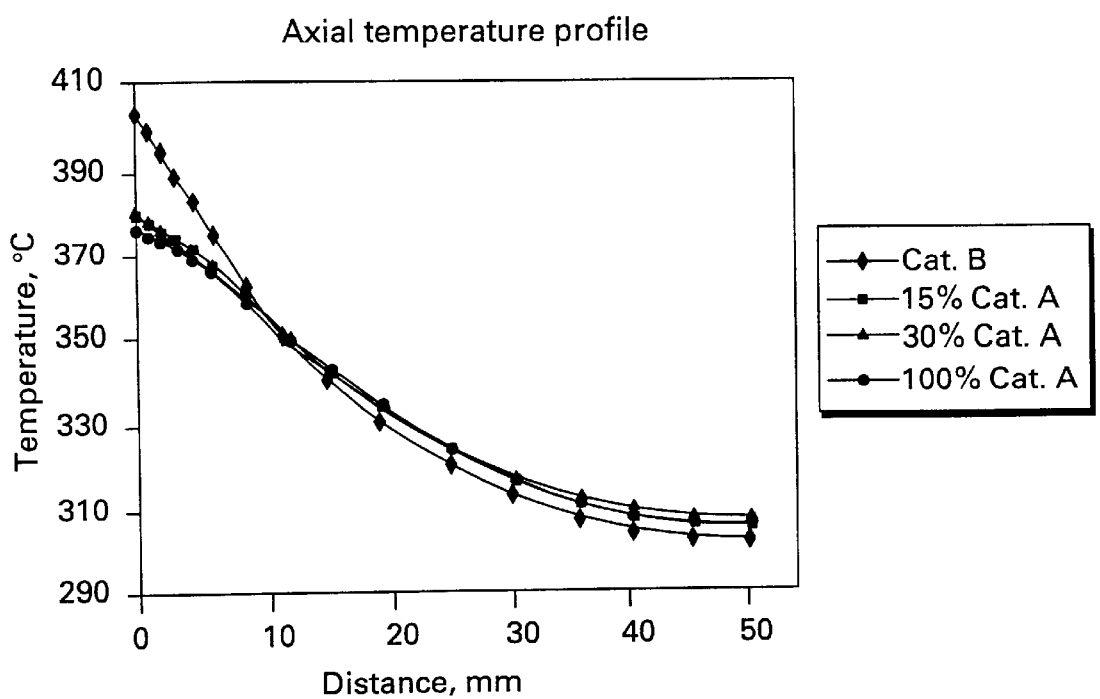
FIG. 2 shows graphs of axial centerline temperatures along the length of a reaction tube for a phosgene synthesis reactions using different catalysts all run at 300° C. reactor set temperature and at a combined flow rate of carbon monoxide and chlorine of 250 standard cubic centimeters per minute.

FIG. 2 shows graphs of axial temperature along the length of a reaction tube for a phosgene synthesis reactions using the different catalysts shown in Table 1 all run at 300° C. set temperature and at a combined flow rate of carbon momonoxide and chlorine of 250 standard cubic centimeters per minute.

FIG. 2 show that the use of composite catalyst beds comprising relatively low activity and relatively high activity catalyst noticeably decreased the exotherm in the reactor hot zone compared to that generated by the highly active carbon catalyst alone. In the case of high set temperature (300° C.; FIG. 2), the exotherm decreased by 20° C. from the uniform bed of catalyst B to a composite catalyst bed. There was practically no difference between the 15% and 30% beds.

Using the composite catalyst beds, the level of carbon tetrachloride in phosgene stream decreased by factor of about two at low temperature and was about 5 times lower at high temperature in comparison with the uniform Catalyst B bed. The carbon tetrachloride levels for the composite catalysts were still higher than that for pure Catalyst A, but the activity of the composite beds was higher. No chlorine breakthrough was observed for the composite beds even at Phosgene produced by the methods of the invention may be used directly or may be recovered from the product gases by known methods such as by passing the gases through a cooling system where they are cooled sufficiently to cause the phosgene contained therein to condense out. The condensed phosgene may then be recovered as a liquid product, usually under pressure.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. Patents cited herein are incorporated herein by reference.

What is claimed is:

1. A method for producing phosgene which comprises contacting in at least one reactor a mixture comprising carbon monoxide and chlorine sequentially with a first catalyst followed by contacting the resulting gaseous reaction mixture comprising phosgene with at least one second catalyst of higher relative activity than a first catalyst.

2. The method of claim 1 wherein a first catalyst has a higher relative selectivity for phosgene than a second catalyst, as measured by the amount of carbon tetrachloride associated with reaction of carbon monoxide and chlorine in contact with each catalyst separately under similar conditions.

3. The method of claim 1 wherein the carbon monoxide:chlorine molar ratio is in a range of between about 1.01:1 and about 1.20:1.

4. The method of claim 1 wherein the carbon monoxide:chlorine molar ratio is in a range of between about 1.02:1 and about 1.12:1.

5. The method of claim 1 wherein phosgene produced contains less than about 55 ppm by volume of carbon tetrachloride.

6. The method of claim 1 wherein phosgene produced contains less than about 20 ppm by volume of carbon tetrachloride.

7. The method of claim 1 wherein phosgene produced contains less than about 10 ppm by volume of carbon tetrachloride.

8. The method of claim 1 wherein phosgene produced contains less than about 7 ppm by volume of carbon tetrachloride.

9. The method of claim 1 wherein phosgene produced contains less than about 5 ppm by volume of carbon tetrachloride.

10. The method of claim 1 wherein phosgene produced contains less than about 1 ppm by volume of carbon tetrachloride.

11. The method of claim 1 wherein at least one catalyst comprises carbon.

12. The method of claim 1 wherein both a first and a second catalyst comprise carbon.

13. The method of claim 1 which comprises contacting in at least one reactor a mixture comprising carbon monoxide and chlorine at a reaction temperature in a range of between about 30° C. and about 350° C.

14. The method of claim 1 which comprises contacting in at least one reactor a mixture comprising carbon monoxide and chlorine at a reaction temperature in a range of between about 30° C. and about 120° C.

15. The method of claim 1 which comprises contacting in at least one reactor a mixture comprising carbon monoxide and chlorine at a reaction temperature in a range of between about 30° C. and about 90° C.

16. The method of claim 1 which comprises contacting in at least one reactor a mixture comprising carbon monoxide and chlorine sequentially with at least one first catalyst zone comprising a catalyst followed by contacting the resulting mixture comprising phosgene with at least one second catalyst zone comprising a catalyst with a higher total surface area than that catalyst in a first catalyst zone.

17. The method of claim 16 wherein at least one catalyst comprises carbon.

18. The method of claim 16 wherein catalysts in both a first and a second catalyst zone comprise carbon.

19. The method of claim 18 wherein catalysts in a first and second catalyst zone are derived from the same material.

20. The method of claim 16 wherein catalyst in a first catalyst zone is diluted with a filler inert to chlorine, carbon monoxide, and phosgene.

21. The method of claim 20 wherein the filler is distributed in a gradient.

22. The method of claim 20 wherein the filler is selected from the group consisting of ceramics, graphite, glassy carbon, glass, quartz, metals, stainless steel, titanium, nickel, and metal alloys.

23. The method of claim 22 wherein a metal alloy is selected from the group consisting nickel alloys comprising iron and chromium, and nickel alloys comprising molybdenum and chromium.

24. A method for producing phosgene which comprises contacting chlorine and a stoichiometric excess of carbon monoxide in at least one reactor sequentially with a first catalyst comprising a porous carbonaceous material in the form of a three-dimensional matrix with a pore volume in a range of between about 0.2 cc/g and about 1.7 cc/g formed by bent layers of carbon of a thickness in a range of between about 100 Å and about 10,000 Å and a radius of curvature in a range of between about 100 Å and about 10,000 Å, a true density in a range of between about 1.80 g/cc and about 2.10 g/cc, an X-ray density in a range of between about 2.112 g/cc and about 2.236 g/cc, and a pore size distribution having its maximum within the range of between about 200 Å and about 2000 Å, followed by contacting the resulting reaction mixture comprising phosgene with a second catalyst comprising coconut shell carbon of higher relative activity than a first catalyst, wherein relative catalyst activity is measured by the exotherm associated with reaction of carbon monoxide and chlorine in contact with each catalyst separately under similar conditions.

25. The method of claim 24 wherein the excess of carbon monoxide is in a range of between about 2% and about 12% of said stoichiometric requirement.

26. The method of claim 24 wherein phosgene produced contains less than about 20 ppm by volume of carbon tetrachloride.

27. The method of claim 24 wherein phosgene produced contains less than about 10 ppm by volume of carbon tetrachloride.

28. The method of claim 24 wherein phosgene produced contains less than about 7 ppm by volume of carbon tetrachloride.

29. The method of claim 24 wherein phosgene produced contains less than about 5 ppm by volume of carbon tetrachloride.

30. The method of claim 24 wherein phosgene produced contains less than about 1 ppm by volume of carbon tetrachloride.

31. The method of claim 24 wherein the amount of first catalyst is in a range between about 0.5% and about 70% of the total catalyst volume.

32. A method for producing phosgene which comprises contacting in at least one reactor a mixture comprising carbon monoxide and chlorine sequentially with at least two catalysts, wherein any catalyst after a first catalyst has a higher relative activity for phosgene formation than the catalyst immediately preceding it.

* * * * *